United States Patent
Liu et al.

(10) Patent No.: US 11,805,521 B2
(45) Date of Patent: Oct. 31, 2023

(54) BEARER MAPPING METHOD FOR WIRELESS BACKHAUL NODE, WIRELESS BACKHAUL NODE AND DONOR BASE STATION

(71) Applicant: DATANG MOBILE COMMUNICATIONS EQUIPMENT CO., LTD., Beijing (CN)

(72) Inventors: Jiamin Liu, Beijing (CN); Ying Wang, Beijing (CN); Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 177 days.

(21) Appl. No.: 17/055,098

(22) PCT Filed: Apr. 30, 2019

(86) PCT No.: PCT/CN2019/085102
§ 371 (c)(1),
(2) Date: Nov. 12, 2020

(87) PCT Pub. No.: WO2019/214497
PCT Pub. Date: Nov. 14, 2019

(65) Prior Publication Data
US 2021/0127380 A1    Apr. 29, 2021

(30) Foreign Application Priority Data

May 11, 2018   (CN) .......................... 201810449589.1

(51) Int. Cl.
*H04W 72/20*  (2023.01)
*H04W 72/54*  (2023.01)

(52) U.S. Cl.
CPC .......... *H04W 72/20* (2023.01); *H04W 72/54* (2023.01)

(58) Field of Classification Search
CPC ............. H04W 72/0406; H04W 72/08; H04W 88/085; H04W 28/0263; H04W 28/0268;
(Continued)

(56) References Cited

U.S. PATENT DOCUMENTS

2010/0103845 A1   4/2010   Ulupinar et al.
2010/0260097 A1*  10/2010  Ulupinar ............... H04W 40/36
                                                      370/315
(Continued)

FOREIGN PATENT DOCUMENTS

CN    101932102 A    12/2010
CN    101998303 A     3/2011
(Continued)

OTHER PUBLICATIONS

"Discussion on QoS and bearer mapping for IAB", R2-1807399, 3GPP TSG-RAN WG2 Meeting #102, Busan, Korea May 21-25, 2018.
(Continued)

*Primary Examiner* — Ashley Shivers
(74) *Attorney, Agent, or Firm* — Ladas & Parry, LLP

(57) ABSTRACT

The present disclosure provides a bearer mapping method of wireless backhaul node, a wireless backhaul node and a donor base station, the bearer mapping method includes: sending bearer configuration information to the wireless backhaul node, wherein the bearer configuration information is used to configure one or more of: a first bearer between the wireless backhaul node and the downstream wireless backhaul node or a UE; the bearer mapping relationship of the first bearer; a second bearer between the wireless backhaul node and the upstream wireless backhaul node or the donor
(Continued)

sending bearer configuration information to the wireless backhaul node, wherein the bearer configuration information is used to configure one or more of: a first bearer between the wireless backhaul node and the downstream wireless backhaul node or a UE; the bearer mapping relationship of the first bearer; a second bearer between the wireless backhaul node and the upstream wireless backhaul node or the donor base station; the bearer mapping relationship of the second bearer; and the bearer mapping relationship between the first bearer and the second bearer.    /—401 base station; the bearer mapping relationship of the second bearer; and the bearer mapping relationship between the first bearer and the second bearer.

12 Claims, 6 Drawing Sheets

(58) Field of Classification Search
CPC ..... H04W 40/22; H04W 76/12; H04W 76/22; H04W 76/11; H04W 28/085; H04W 76/34; H04W 76/10; H04W 76/20; H04W 76/30; H04L 5/0053
See application file for complete search history.

(56) References Cited

U.S. PATENT DOCUMENTS

| | | | |
|---|---|---|---|
| 2010/0265873 | A1 | 10/2010 | Yi et al. |
| 2012/0092994 | A1 | 4/2012 | Wang et al. |
| 2015/0156663 | A1 | 6/2015 | Wang et al. |
| 2017/0019811 | A1 | 1/2017 | Parulkar |
| 2019/0044754 | A1* | 2/2019 | Hampel ............... H04B 7/2606 |
| 2019/0349834 | A1* | 11/2019 | Teyeb ................. H04W 84/18 |

FOREIGN PATENT DOCUMENTS

| | | |
|---|---|---|
| CN | 102439871 A | 5/2012 |
| CN | 103118401 A | 5/2013 |
| CN | 106304242 A | 1/2017 |
| CN | 106358241 A | 1/2017 |
| WO | 2010118781 A1 | 10/2010 |

OTHER PUBLICATIONS

"Discussion on Bearer mapping between UE DRB and IAB DRB", R2-1807550, 3GPP TSG-RAN WG2 Meeting #102, Busan, Korea May 21-25, 2018.
"Considerations on bearer management for L2 IAB architecture", R3-181757, 3GPP TSG-RAN WG3 #99bis, Sanya, China, Apr. 16-20, 2018.
First Office Action and Search Report from CN app. no. 201810449589.1, dated Sep. 3, 2020, with English translation from Global Dossier.
International Search Report from PCT/CN2019/085102, dated Jun. 28, 2019, with English translation from WIPO.
Written Opinion of the International Searching Authority from PCT/CN2019/085102, dated Jun. 28, 2019, with English translation from WIPO.
International Preliminary Report on Patentability from PCT/CN2019/085102, dated Nov. 17, 2020, with English translation from WIPO.
Extended European Search Report from EP app. no. 19799923.8, dated Jun. 7, 2021.

* cited by examiner

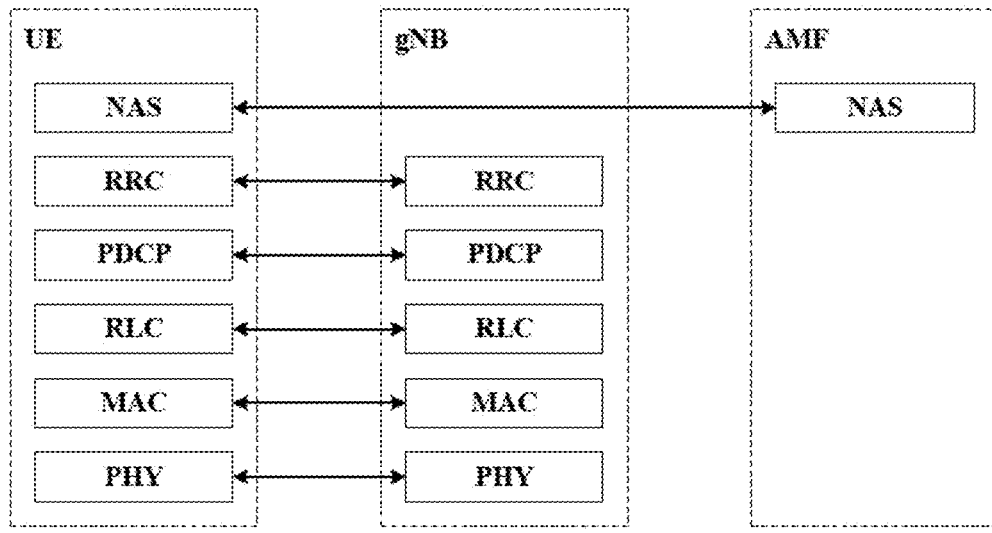

Fig. 3 sending bearer configuration information to the wireless backhaul node, wherein the bearer configuration information is used to configure one or more of: a first bearer between the wireless backhaul node and the downstream wireless backhaul node or a UE; the bearer mapping relationship of the first bearer; a second bearer between the wireless backhaul node and the upstream wireless backhaul node or the donor base station; the bearer mapping relationship of the second bearer; and the bearer mapping relationship between the first bearer and the second bearer. ─401

Fig. 4

BEARER MAPPING METHOD FOR WIRELESS BACKHAUL NODE, WIRELESS BACKHAUL NODE AND DONOR BASE STATION

CROSS-REFERENCE TO RELATED APPLICATION

This application is the U.S. national phase of PCT Application No. PCT/CN2019/085102 filed on Apr. 30, 2019 which claims priority to Chinese Patent Application No. 201810449589.1 filed in China on May 11, 2018, the disclosures of which are incorporated in their entireties by reference herein.

TECHNICAL FIELD

The present disclosure relates to the field of communications technology, and in particular to a bearer mapping method for wireless backhaul node, a wireless backhaul node and a donor base station.

BACKGROUND

In the future development of mobile communication system, in order to meet user's requirement, network capacity and throughput will be greatly improved, more transmission nodes and increased transmission bandwidth will be introduced. In the fifth-generation communication technology (5G) network, the number of access sites is greatly increased, but not all the access sites can be guaranteed a condition of wired backhaul, therefore introduction of wireless access sites will be unavoidable. The high requirements regarding to transmission rate and transmission delay in 5G propose higher requirements on wireless backhaul networks.

In the related art, there is no bearer mapping method for 5G wireless backhaul nodes using multi-hop connection. Since the version 10 (R10) Relay is a layer three (L3) device and has a single-hop connection, the bearer mapping method thereof cannot be directly applied to the 5G wireless backhaul node path. Therefore, a new bearer mapping method is urgently needed to meet the requirements of providing stable data transmission services for the users.

SUMMARY

An object of the embodiments of the present disclosure is to provide a bearer mapping method of wireless backhaul node, a wireless backhaul node and a donor base station capable of solving the problem of bearer mapping for wireless backhaul node path.

In a first aspect, embodiments of the present disclosure provide a bearer mapping method for wireless backhaul nodes, which is applied to a donor base station, and the method includes:

sending bearer configuration information to the wireless backhaul node, wherein the bearer configuration information is used to configure one or more of:

a first bearer between the wireless backhaul node and the downstream wireless backhaul node or a UE;

the bearer mapping relationship of the first bearer;

a second bearer between the wireless backhaul node and the upstream wireless backhaul node or the donor base station;

the bearer mapping relationship of the second bearer; and the bearer mapping relationship between the first bearer and the second bearer.

Optionally, the bearer mapping relationship between the first bearer and the second bearer includes: multiple first bearers corresponding to one second bearer; or, one first bearer corresponding to multiple second bearers.

Optionally, the method further includes:

sending a first indication information to the wireless backhaul node, the first indication information indicating the wireless backhaul node to create, modify or release a corresponding bearer mapping relationship.

Optionally, the bearer mapping relationship of the first bearer or the bearer mapping relationship of the second bearer includes one or more of the following:

the first bearer or the second bearer corresponding to one or more QoS identifiers;

the first bearer or the second bearer corresponding to a combination of one or more UE identifiers and bearer identifiers;

the first bearer or the second bearer corresponding to a combination of one or more UE identifiers and QoS flow identifiers.

Optionally, the method further includes:

sending a second indication information to the wireless backhaul node, the second indication information indicating the wireless backhaul node to create or modify the corresponding bearer mapping relationship according to the newly added QoS identifier, a combination of the newly added UE identifier and the bearer identifier, or a combination of the newly added UE identifier and the QoS flow identifier; or, sending a third indication information to the wireless backhaul node, the third indication information indicating the wireless backhaul node to release or modify the corresponding bearer mapping relationship according to the released QoS identifier, the released combination of the UE identifier and the bearer identifier, or the released combination of the UE identifier and the QoS flow identifier.

Optionally, the method further includes:

configuring QoS parameters of multiple wireless interfaces, the wireless interface referring to a wireless interface through which the UE access the donor base station, and the QoS parameters meet the peer-to-peer requirements of the UE.

In a second aspect, the embodiments of the present disclosure also provide a bearer mapping method for a wireless backhaul node, which is applied to the wireless backhaul node, and the method includes:

receiving the bearer configuration information from the donor base station;

configuring one or more of the following according to the bearer configuration information:

the first bearer between the wireless backhaul node and the downstream wireless backhaul node or a UE;

the bearer mapping relationship of the first bearer;

the second bearer between the wireless backhaul node and the upstream wireless backhaul node or the donor base station;

the bearer mapping relationship of the second bearer; and the bearer mapping relationship between the first bearer and the second bearer.

Optionally, the first bearer or the second bearer is a newly-created bearer according to the bearer configuration information or a reused bearer.

Optionally, the bearer mapping relationship between the first bearer and the second bearer includes: multiple first bearers corresponding to one second bearer; or, one first bearer corresponding to multiple second bearers.

Optionally, the method further includes:

receiving a data packet from the donor base station or the upstream wireless backhaul node, the data packet including a destination node identifier;

determining the corresponding first bearer according to the destination node identifier and the bearer mapping relationship;

sending the data packet through the determined first bearer;

or, receiving a data packet from a downstream wireless backhaul node or UE, the data packet including a destination node identifier;

determining the corresponding second bearer according to the destination node identifier and the bearer mapping relationship;

sending the data packet through the determined second bearer.

Optionally, the method further includes:

receiving the first indication information from the donor base station or the upstream wireless backhaul node;

indicating to create, modify or release the corresponding bearer mapping relationship according to the first indication information.

Optionally, the bearer mapping relationship of the first bearer or the bearer mapping relationship of the second bearer includes one or more of the following:

the first bearer or the second bearer corresponding to one or more QoS identifiers;

the first bearer or the second bearer corresponding to a combination of one or more UE identifiers and the bearer identities;

the first bearer or the second bearer corresponding to a combination of one or more UE identifiers and the QoS identities.

Optionally, the method further includes:

receiving a data packet from a donor base station or an upstream wireless backhaul node, the data packet includes: destination node identifier and QoS identifier, or the data packet includes: a combination of the destination node identifier and the UE identifier and the bearer identifier; or a combination of the destination node identifier and the UE identifier and the QoS flow identifier;

determining a corresponding first bearer, according to the bearer mapping relationship, the destination node identifier and the QoS identifier, or according to a combination of the bearer mapping relationship, the destination node identifier, the UE identifier and the bearer identifier, or according to a combination of the bearer mapping relationship, the destination node identifier, the UE identifier and the QoS flow identifier;

sending the data packet through the determined first bearer;

or, receiving a data packet from the downstream wireless backhaul node or a UE, the data packet includes: the destination node identifier and the QoS identifier, or the data packet includes: a combination of the destination node identifier, the UE identifier and the bearer identifier; or a combination of the destination node identifier, the UE identifier and the QoS flow identifier;

determining a corresponding second bearer, according to the bearer mapping relationship, the destination node identifier and the QoS identifier, or according to a combination of the bearer mapping relationship, the destination node identifier, the UE identifier and the bearer identifier combination, or according to a combination of the bearer mapping relationship, the destination node identifier, the UE identifier and the QoS flow identifier;

sending the data packet through the determined second bearer.

Optionally, the method further includes:

receiving the second indication information from the donor base station or the upstream wireless backhaul node;

creating or modifying the corresponding bearer mapping relationship, according to the second indication information and the newly added QoS identifier, a combination of the newly added UE identifier and bearer identifier, or a combination of the newly added UE identifier and the QoS flow identifier combination;

or, receiving the third indication information from the donor base station or the upstream wireless backhaul node;

releasing the corresponding bearer mapping relationship according to the third indication information and the released QoS identifier, a combination of the released UE identifier and the bearer identifier, or a combination of the released UE identifier and the QoS flow identifier.

In a third aspect, an embodiment of the present disclosure also provides a donor base station, including: a first transceiver and a first processor, wherein the first transceiver is configured to send bearer configuration information to a wireless backhaul node, wherein the bearer configuration information is used to configure one or more of the following:

a first bearer between the wireless backhaul node and the downstream wireless backhaul node or a UE;

the bearer mapping relationship of the first bearer;

a second bearer between the wireless backhaul node and the upstream wireless backhaul node or the donor base station;

the bearer mapping relationship of the second bearer; and the bearer mapping relationship between the first bearer and the second bearer.

Optionally, the bearer mapping relationship between the first bearer and the second bearer includes: multiple first bearers corresponding to one second bearer; or, one first bearer corresponding to multiple second bearer.

Optionally, the first transceiver is further configured to send the first indication information to the wireless backhaul node, the first indication information indicating the wireless backhaul node to create, modify, or release a corresponding bearer mapping relationship.

Optionally, the bearer mapping relationship of the first bearer or the bearer mapping relationship of the second bearer includes one or more of the following:

the first bearer or the second bearer corresponding to one or more QoS identifier;

the first bearer or the second bearer corresponding to a combination of one or more UE identifier and bearer identifier;

the first bearer or the second bearer corresponding to a combination of one or more UE identifier and QoS flow identifier.

Optionally, the first transceiver is further configured to: send the second indication information to the wireless backhaul node, the second indication information indicating the wireless backhaul node to create or modify a corresponding bearer mapping relationship, according to a combination of the newly added QoS identifier, the newly added UE identifier and the bearer identifier or a combination of the newly added UE identifier and the QoS flow identifier; or, send the third indication information to the wireless backhaul node, the third indication information indicating the wireless backhaul node to release or modify a corresponding bearer mapping relationship, according to a combination of the released QoS identifier, the released UE identifier and the bearer identifier, or a combination of the released UE identifier and the QoS flow identifier.

Optionally, the first processor is used to: configure QoS parameters of multiple radio interfaces, wherein the radio interfaces refer to radio interfaces through which the UE access to the donor base station, and the QoS parameters satisfy the peer-to-peer demand of the UE.

In a fourth aspect, the embodiments of the present disclosure also provide a wireless backhaul node, the wireless backhaul node includes:

a second transceiver and a second processor, wherein the second transceiver is configured to receive the bearer configuration information from the donor base station;

the second processor is used to configure one or more of the following according to the bearer configuration information:

the first bearer between the wireless backhaul node and the downstream wireless backhaul node or a UE;

the bearer mapping relationship of the first bearer;

the second bearer between the wireless backhaul node and the upstream wireless backhaul node or the donor base station;

the bearer mapping relationship of the second bearer; and the bearer mapping relationship between the first bearer and the second bearer.

Optionally, the first bearer or the second bearer is a newly-created bearer according to the bearer configuration information or a reused bearer.

Optionally, the bearer mapping relationship between the first bearer and the second bearer includes: multiple first bearers corresponding to one second bearer; or, one first bearer corresponding to multiple second bearers.

Optionally, the second transceiver is further configured to receive a data packet from the donor base station or the upstream wireless backhaul node, the data packet including a destination node identifier;

the second processor is further configured to determine the corresponding first bearer according to the destination node identifier and the bearer mapping relationship;

the second transceiver is further configured to send the data packet through the determined first bearer;

or, the second transceiver is further configured to receive a data packet from a downstream wireless backhaul node or a UE, the data packet including a destination node identifier;

the second processor is further configured to determine the corresponding second bearer according to the destination node identifier and the bearer mapping relationship;

the second transceiver is further configured to send the data packet through the determined second bearer.

Optionally, the second transceiver is further configured to receive the first indication information from the donor base station or the upstream wireless backhaul node;

the second processor is further configured to indicate to create, modify or release the corresponding bearer mapping relationship according to the first indication information.

Optionally, the bearer mapping relationship of the first bearer or the bearer mapping relationship of the second bearer includes one or more of the following:

the first bearer or the second bearer corresponding to one or more QoS identifiers;

the first bearer or the second bearer corresponding to a combination of one or more UE identifiers and the bearer identities;

the first bearer or the second bearer corresponding to a combination of one or more UE identifiers and the QoS identities.

Optionally, the second transceiver is further configured to receive a data packet from a donor base station or an upstream wireless backhaul node, the data packet includes: destination node identifier and QoS identifier, or the data packet includes: a combination of the destination node identifier and the UE identifier and the bearer identifier; or a combination of the destination node identifier and the UE identifier and the QoS flow identifier;

the second processor is further configured to determine a corresponding first bearer, according to the bearer mapping relationship, the destination node identifier and the QoS identifier, or according to a combination of the bearer mapping relationship, the destination node identifier, the UE identifier and the bearer identifier, or according to a combination of the bearer mapping relationship, the destination node identifier, the UE identifier and the QoS flow identifier;

the second transceiver is further configured to send the data packet through the determined first bearer;

or, receive a data packet from the downstream wireless backhaul node or a UE, the data packet includes: the destination node identifier and the QoS identifier, or the data packet includes: a combination of the destination node identifier, the UE identifier and the bearer identifier; or a combination of the destination node identifier, the UE identifier and the QoS flow identifier;

the second processor is further configured to determine a corresponding second bearer, according to the bearer mapping relationship, the destination node identifier and the QoS identifier, or according to a combination of the bearer mapping relationship, the destination node identifier, the UE identifier and the bearer identifier combination, or according to a combination of the bearer mapping relationship, the destination node identifier, the UE identifier and the QoS flow identifier;

the second transceiver is further configured to send the data packet through the determined second bearer.

Optionally, the second transceiver is further configured to receive the second indication information from the donor base station or the upstream wireless backhaul node;

the second processor is further configured to create or modify the corresponding bearer mapping relationship, according to the second indication information and the newly added QoS identifier, a combination of the newly added UE identifier and bearer identifier, or a combination of the newly added UE identifier and the QoS flow identifier combination;

or, the second transceiver is further configured to receive the third indication information from the donor base station or the upstream wireless backhaul node;

the second processor is further configured to release the corresponding bearer mapping relationship according to the third indication information and the released QoS identifier, a combination of the released UE identifier and the bearer identifier, or a combination of the released UE identifier and the QoS flow identifier.

In a fifth aspect, embodiments of the present disclosure further provide a donor base station including a processor, a storage, and a computer program stored on the storage and executable by the processor, the computer program implementing, when executed by the processor, the steps of the bearer mapping method for wireless backhaul nodes according to the first aspect.

In a sixth aspect, embodiments of the present disclosure further provide a wireless backhaul node including a processor, a storage, and a computer program stored on the storage and executable by the processor, the computer program implementing, when executed by the processor, the steps of the bearer mapping method for the wireless backhaul node according to the second aspect.

In a seventh aspect, embodiments of the present disclosure further provide a computer readable storage medium having a computer program stored thereon, the computer program implementing, when executed by a processor, the steps of the bearer mapping method for the wireless backhaul node according to the first aspect or the second aspect.

According to the embodiments of the present disclosure, when a wireless backhaul node exists in the network, the bearer mapping can be correctly carried out on the wireless backhaul nodes to minimize the complexity of the standard work, the requirements of subsequent UE services and data transmission can be satisfied, and the system management efficiency is improved.

BRIEF DESCRIPTION OF THE DRAWINGS

By reading the detailed description of the optional embodiments below, various other advantages and benefits will become clear to those of ordinary skill in the art. The accompanying drawings are merely used to show the purpose of the optional embodiments, rather than any limitation to the present disclosure. Same reference numerals represent the same components throughout the accompanying drawings. In the drawings:

FIG. 3 is a schematic diagram of the control plane protocol stack in related art.

FIG. 4 is a flowchart showing the bearer mapping method of the wireless backhaul node according to embodiments of the present disclosure.

DETAILED DESCRIPTION

The technical solutions in the embodiments of the present disclosure will be described below clearly and thoroughly in conjunction with the drawings in the embodiments of the present disclosure. Obviously, the described embodiments are some of the embodiments of the present disclosure, but not all the embodiments. Based on the embodiments in the present disclosure, all other embodiments obtained by those of ordinary skill in the art without making creative efforts fall within the protection scope of the present disclosure.

The term "includes" and any variations thereof in the present specification and claims are intended to cover non-exclusive inclusions. For example, a process, a method, a system, a product, or a device that includes a series of steps or units are not necessarily limited to those steps or units listed expressly, but instead may include other steps or units not expressly listed or inherent to the process, the method, the system, the product, or the device. Further, "and/or" used in the specification and claims means at least one of the connected objects. For example, "A and/or B" means there are three cases including separate A, separate B, and both A and B.

In the embodiment of the present disclosure, the terms "exemplary" or "for example" are used as examples or illustrations. Any embodiment or design described as "exemplary" or "for example" in the present disclosure should not be interpreted as more preferable or advantageous over other embodiments or designs. In particular, the terms such as "exemplary" or "for example" are intended to render the relevant concepts in a specific way.

For a better understanding of the technical solution of embodiment the present disclosure, the following technical concepts are introduced firstly.

(1) Introduction to 5G Mobile Communication System

Figure 1:
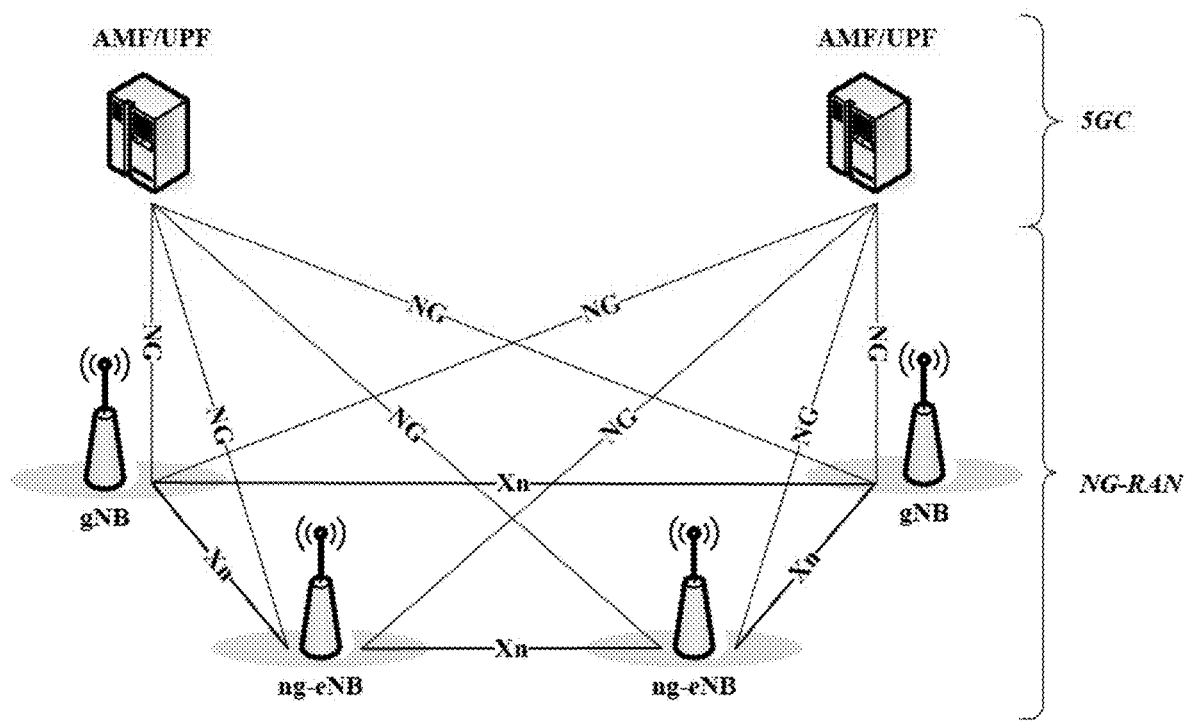
FIG. 1 is a schematic diagram of 5G mobile communication system in related art.

In the 5G system, most of the nodes on the network side have wired connection, that is, the gNBs are connected through wired links, the gNB (NR NodeB) and core network nodes, such as access and mobility management function (Access and Mobility Management Function. AMF), user surface function (User Plane Function, UPF), are also connected through wired links, as shown in FIG. 1.

(2) Introduction to 5G Wireless Protocol Architecture.

Figure 2:
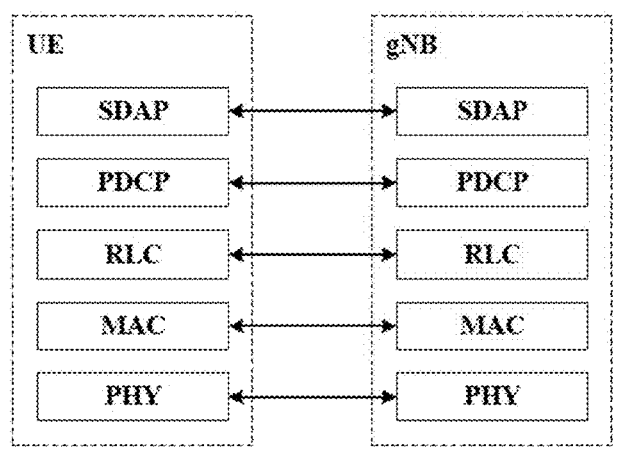
FIG. 2 is a schematic diagram of the user-plane protocol stack in related art.

The 5G basic user plane protocol layer includes: service discovery application specification (Service Discovery Application Profile, SDAP), packet data convergence protocol (Packet Data Convergence Protocol, PDCP), radio link control (Radio Link Control, RLC) protocol, media access control (Media Access Control, MAC) and physical layer (PHY). The control plane protocol layer includes: non-access stratum (Non-access stratum, NAS), radio resource control (Radio Resource Control, RRC), PDCP, RLC, MAC and PHY The schematic diagrams of the protocol stack architecture of the user plane and the control plane are shown in FIGS. 2 and 3.

FIG. 4 shows a flowchart of the bearer mapping method for wireless backhaul nodes according to the embodiments of the present disclosure, which is applied to a donor base station. The method includes:

Step 401, sending bearer configuration information to the wireless backhaul node, wherein the bearer configuration information is used to configure one or more of:

a first bearer between the wireless backhaul node and the downstream wireless backhaul node or a UE;

the bearer mapping relationship of the first bearer;

a second bearer between the wireless backhaul node and the upstream wireless backhaul node or the donor base station;

the bearer mapping relationship of the second bearer; and the bearer mapping relationship between the first bearer and the second bearer.

In the embodiments of the present disclosure, optionally, the donor base station may send the bearer configuration information to the wireless backhaul node through radio resource control (Radio Resource Control, RRC) signaling.

In the embodiments of the present disclosure, optionally, the bearer mapping relationship between the first bearer and the second bearer includes: multiple first bearers corresponding to one second bearer; or, one first bearer corresponding to multiple second bearers. For example, a bearer between a UE and its access node IAB1 can be diverted to two upstream bearers, which are the bearer between IAB1 and IAB2 and the upstream bearer between IAB1 and IAB3. That is, the data of the UE can be multipath routed to increase flexibility and probability of successful transmission, and better data diversion and load balancing can be achieved.

In the embodiments of the present disclosure, optionally, the method further includes:

sending a first indication information to the wireless backhaul node, the first indication information indicating the wireless backhaul node to create, modify or release a corresponding bearer mapping relationship.

In the embodiments of the present disclosure, optionally, the bearer mapping relationship of the first bearer or the bearer mapping relationship of the second bearer includes one or more of the following:

the first bearer or the second bearer corresponding to one or more QoS identifiers;

the first bearer or the second bearer corresponding to a combination of one or more UE identifiers and bearer identifiers;

the first bearer or the second bearer corresponding to a combination of one or more UE identifiers and QoS flow identifiers.

In the embodiments of the present disclosure, optionally, the method further includes:

sending a second indication information to the wireless backhaul node, the second indication information indicating the wireless backhaul node to create or modify the corresponding bearer mapping relationship according to the newly added QoS identifier, a combination of the newly added UE identifier and the bearer identifier, or a combination of the newly added UE identifier and the QoS flow identifier; or, sending a third indication information to the wireless backhaul node, the third indication information indicating the wireless backhaul node to release or modify the corresponding bearer mapping relationship according to the released QoS identifier, the released combination of the UE identifier and the bearer identifier, or the released combination of the UE identifier and the QoS flow identifier.

In the embodiments of the present disclosure, optionally, the method further includes:

configuring QoS parameters of multiple wireless interfaces, the wireless interface referring to a wireless interface through which the UE access the donor base station, and the QoS parameters meet the peer-to-peer requirements of the UE.

According to the embodiments of the present disclosure, when a wireless backhaul node exists in the network, the bearer mapping can be correctly carried out on the wireless backhaul nodes to maximize the reuse of the existing process, the requirements of subsequent UE services and data transmission can be satisfied, and the system management efficiency is improved.

Figure 5:
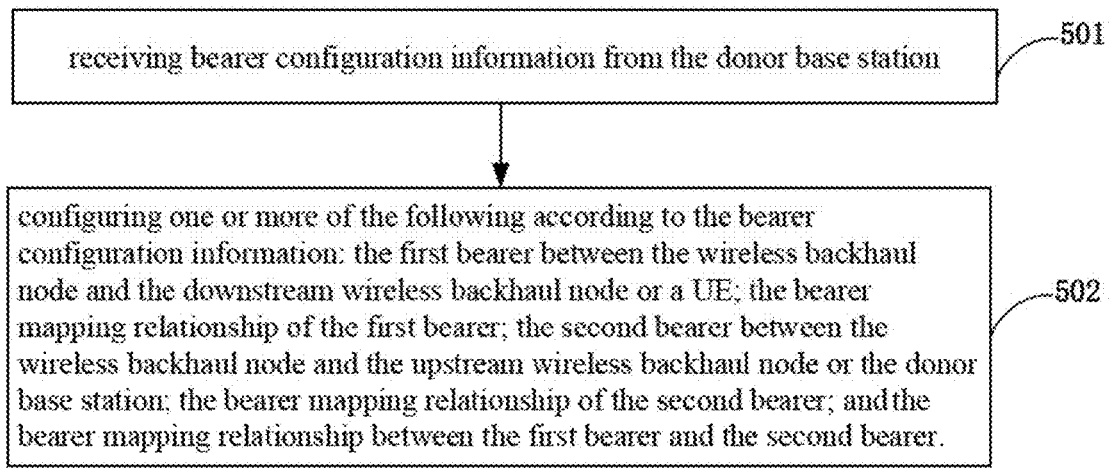
FIG. 5 is another flowchart showing the bearer mapping method of the wireless backhaul node according to embodiments of the present disclosure.

FIG. 5 shows a flowchart of the bearer mapping method of the wireless backhaul node according to embodiments of the present disclosure, which is applied to a wireless backhaul node. The method includes:

Step 501, receiving the bearer configuration information from the donor base station;

Step 502, configuring one or more of the following according to the bearer configuration information:

the first bearer between the wireless backhaul node and the downstream wireless backhaul node or a UE;

the bearer mapping relationship of the first bearer;

the second bearer between the wireless backhaul node and the upstream wireless backhaul node or the donor base station;

the bearer mapping relationship of the second bearer; and the bearer mapping relationship between the first bearer and the second bearer.

In the embodiments of the present disclosure, optionally, the first bearer or the second bearer is a newly-created bearer according to the bearer configuration information or a reused bearer.

In the embodiments of the present disclosure, optionally, the wireless backhaul node receives the RRC signaling from the donor base station, and the RRC signaling includes the bearer configuration information.

In the embodiments of the present disclosure, optionally, the bearer mapping relationship between the first bearer and the second bearer includes: multiple first bearers corresponding to one second bearer; or, one first bearer corresponding to multiple second bearers.

In the embodiments of the present disclosure, optionally, the method further includes:

receiving a data packet from the donor base station or the upstream wireless backhaul node, the data packet including a destination node identifier;

determining the corresponding first bearer according to the destination node identifier and the bearer mapping relationship; and sending the data packet through the determined first bearer.

In the embodiments of the present disclosure, optionally, the method further includes:

receiving a data packet from a downstream wireless backhaul node or UE, the data packet including a destination node identifier;

determining the corresponding second bearer according to the destination node identifier and the bearer mapping relationship; and sending the data packet through the determined second bearer.

In the embodiments of the present disclosure, optionally, the method further includes:

receiving the first indication information from the donor base station or the upstream wireless backhaul node;

indicating to create, modify or release the corresponding bearer mapping relationship according to the first indication information.

In the embodiments of the present disclosure, optionally, the bearer mapping relationship of the first bearer or the bearer mapping relationship of the second bearer includes one or more of the following:

the first bearer or the second bearer corresponding to one or more QoS identifiers;

the first bearer or the second bearer corresponding to a combination of one or more UE identifiers and the bearer identities;

the first bearer or the second bearer corresponding to a combination of one or more UE identifiers and the QoS identities.

In the embodiments of the present disclosure, optionally, the method further includes:

receiving a data packet from a donor base station or an upstream wireless backhaul node, the data packet includes: destination node identifier and QoS identifier, or the data packet includes: a combination of the destination node identifier and the UE identifier and the bearer identifier; or a combination of the destination node identifier and the UE identifier and the QoS flow identifier;

determining a corresponding first bearer, according to the bearer mapping relationship, the destination node identifier and the QoS identifier, or according to a combination of the bearer mapping relationship, the destination node identifier, the UE identifier and the bearer identifier, or according to a combination of the bearer mapping relationship, the destination node identifier, the UE identifier and the QoS flow identifier;

sending the data packet through the determined first bearer.

In the embodiments of the present disclosure, optionally, the method further includes:

receiving a data packet from the downstream wireless backhaul node or a UE, the data packet includes: the destination node identifier and the QoS identifier, or the data packet includes: a combination of the destination node identifier, the UE identifier and the bearer identifier; or a combination of the destination node identifier, the UE identifier and the QoS flow identifier;

determining a corresponding second bearer, according to the bearer mapping relationship, the destination node identifier and the QoS identifier, or according to a combination of the bearer mapping relationship, the destination node identifier, the UE identifier and the bearer identifier combination, or according to a combination of the bearer mapping relationship, the destination node identifier, the UE identifier and the QoS flow identifier;

sending the data packet through the determined second bearer.

In the embodiments of the present disclosure, optionally, the method further includes:

receiving the second indication information from the donor base station or the upstream wireless backhaul node;

creating or modifying the corresponding bearer mapping relationship, according to the second indication information and the newly added QoS identifier, a combination of the newly added UE identifier and bearer identifier, or a combination of the newly added UE identifier and the QoS flow identifier combination;

or, receiving the third indication information from the donor base station or the upstream wireless backhaul node;

releasing the corresponding bearer mapping relationship according to the third indication information and the released QoS identifier, a combination of the released UE identifier and the bearer identifier, or a combination of the released UE identifier and the QoS flow identifier.

According to the embodiments of the present disclosure, when a wireless backhaul node exists in the network, the bearer mapping can be correctly carried out on the wireless backhaul nodes to maximize the reuse of the existing process, the requirements of subsequent UE services and data transmission can be satisfied, and the system management efficiency is improved.

Example 1

Figure 6:
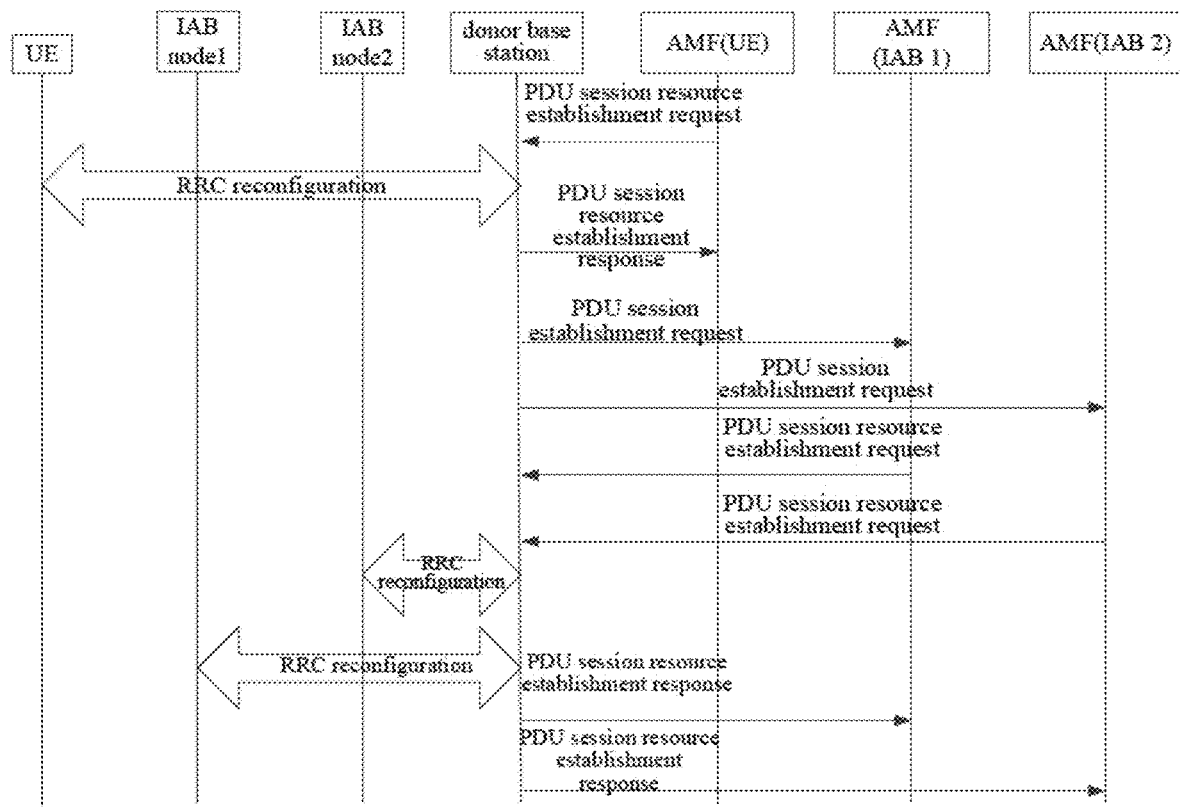
FIG. 6 is a schematic diagram of the signaling flow in a two-hop scenario according to embodiments of the present disclosure.

Referring to FIG. 6, a signaling flow in a two-hop scenario according to the embodiments of the present disclosure is shown. The multi-hop scenario is similar and will not be repeated here.

The specific process is as follows:

When the UE has services to transmit, it initiates a service establishment request to the core network. When the UE is calling, it makes the request through the service request process, and when the UE is called, firstly the core network pages the UE and then the UE initiates the service request process.

When the core network node is informed that the UE has services to transmit, it needs to request the wireless access network (Radio Access Network, RAN) node to establish a suitable transmission channel for the UE. The RAN node is generally a base station (gNB), and in the embodiment of the present disclosure, because the UE is layered under the IAB (Integrated Access and Backhaul) node, the UE seen by the core network is a cell residing or connected under the donor base station (Donor). The process of establishing a suitable transmission channel for the UE is typically performed by sending a PDU session resource establishment or modification request to gNB through the access and mobility management function (Access and Mobility management Function, AMF) node.

After receiving the request from the core network, the RAN node, for example the Donor, establishes the request transmission for the UE, or finds a suitable bearer for the UE to transmit LE data according to the business QoS requirements carried in the request.

Generally, the Donor carries new bearer establishment information or bearer modification information through the RRC connection reconfiguration message sent to the UE. Since the network side RRC layer of the UE is located in the Donor, this process is an L3 signaling process between the Donor and the UE. The configured bearer is used for the bearer between the UE and its first hop (or accessed IAB node). In this example, the bearer information configured by the Donor to UE is used to establish or modify the bearer between the UE and the IAB Node 1.

After the bearer modification of the UE is completed or in parallel with the bearer modification, the Donor checks the hop nodes that the UE data passes, such as LAB node1 and IAB node2, to query whether there is a dedicated wireless bearer capable of carrying the newly arrived service of the UE. If not, a new bearer needs to be established for the new UE service. If there is already a bearer with the same or similar QoS requirements, the Donor can reconfigure the bearer to satisfy the newly added service, such as making some mapping updates or parameter changes.

For example, if the UE initiates a new service with level 3 QoS, the delay requirement of the service is 150 ms, the block error rate requirement is 10-6, there is no requirement to guarantee the bit rate, and the scheduling priority is 5, then this is a typical radio link control (Radio Link Control, RLC) acknowledged mode (Acknowledged Mode, AM) service.

If there is no corresponding bearer between the UE and LAB node1, the Donor will notify the UE and IAB Dode1 to establish a RLC AM bearer for the service, and configure corresponding transmission parameters according to the QoS requirements, such as hybrid automatic repeat request (Hybrid Automatic Repeat reQuest, HARQ) maximum 4 retransmissions, RLC ARQ maximum 3 retransmissions, and so on. If there is already a similar bearer between IAB node1 and LAB node2, the Donor does not need to establish a new bearer between IAB node1 and IAB node2, but only needs to inform IAB node1 and IAB node2 that the new service of the UE will also be transmitted on the existing bearer in the future. Accordingly, it may be necessary to reconfigure the parameters of the bearer that already exist between IAB node1 and LAB node2, for example, an UE data stream is to be added, such that the prioritized bit rate (Prioritized Bit Rate, PBR) needs to be increased accordingly. If there is no corresponding bearer between IAB node2 and the Donor that can be used to transmit the new service, the Donor needs to inform IAB node2 to establish a new bearer for this, and the parameters of the bearer shall match the QoS requirements of the new service.

In the above process, the Donor node is used as the user plane function (User Plane Functions, UPF) node of IAB node1 and IAB node2, initiating the PDU session establishment or request to the core network, so that the core network AMF can initiate the subsequent PDU session process.

It should be noted that there is another way that LAB node1 and LAB node2 themselves initiate the PDU session process to the respective core network nodes. There are some differences between the two methods in the trigger nodes, but the final effect is the same, that is, the core network node(s) update the PDU session information for LAB node1 and LAB node2 to carry the new services of the UE. In different network architectures, it is also possible that the bearer management of LAB node1 and LAB node2 does not go through the core network nodes, but is completely controlled by the RAN side nodes (such as the Donor).

Example 2: Showing the Signaling Configuration Mapping Relationship

An LAB node needs to serve many UE, and each UE has the same or different services. The service IAB node bears the business data of these UE in two ways:

One is to carry out one-to-one mapping in a manner of per UE per bearer. The advantage of this manner is that the mapping relationship is simple, each level of IAB node can be distinguished to the granularity of UE bearer, and the scheduling granularity is more accurate, but the disadvantage is that with the increase of the number of served UEs, the number of bearers on the IAB node increases significantly, leading to large complexity and overhead to the management and scheduling. Moreover, since the number of bearer supported by the existing UE air interface is limited, the maximum number is one of 16-29, the current standard has not been finalized, but it will not be unlimited. In this case, the number of bearers on the LAB node increases with the increase of the number of served UE, most of the existing air interface processes cannot be reused, new processes need to be redesigned, and the standard workload is very huge.

Another way is to aggregate the bearers of the UEs with the same or similar QoS requirements, and map it to the bearer of the same IAB node.

For example, if the bearer1 of UE1, the bearer 4 of UE2, the bearer 2 of UE3 has the same or similar QoS requirements, they can be mapped to the Bearer1 of the IAB node for aggregated transmission. In this way, the number of IAB bearers can be effectively controlled. The maximum number limit of existing bearers can generally meet the requirements of the number of IAB bearers, therefore, various processes and packet structures of existing air interface can be directly reused, and the complexity and overhead of various management and scheduling are relatively low. In this example, the configuration and management of the bearer mapping is mainly based on the second way.

Figure 7:
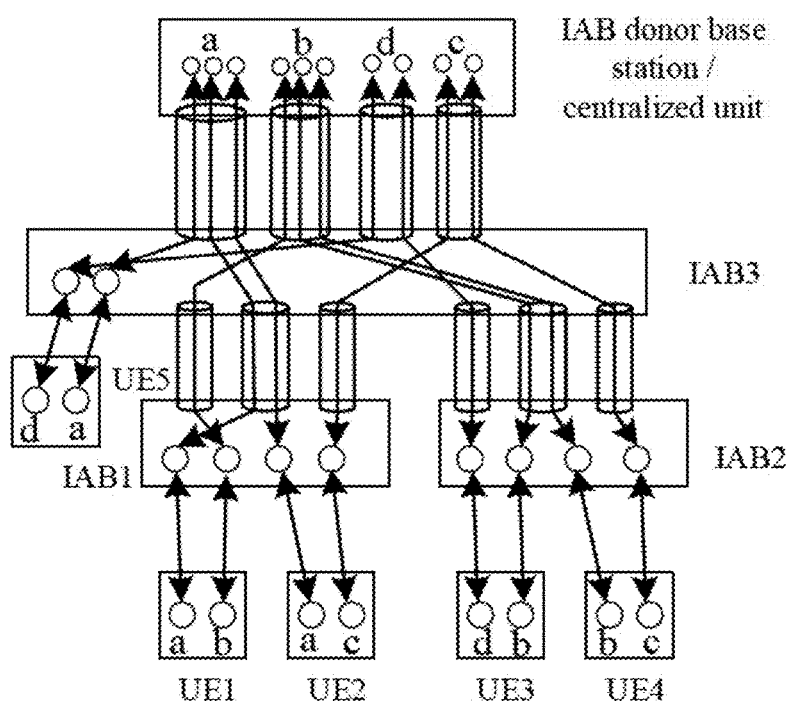
FIG. 7 is a schematic diagram of the bearer mapping in a multi-hop scenario according to embodiments of the present disclosure.

Referring to FIG. 7, FIG. 7 shows a schematic diagram of the bearer mapping in a multi-hop scenario, where the lines indicated by the same letter represent the bearer of the same or similar QoS requirements. The Donor, as a central control node, configures the following information to the respective UEs and LAB nodes:

each UE gets the configuration for each bearer;

an IAB node need to know each bearer in downstream and upstream, as well as the detailed mapping relationship therebetween.

The examples in the figure are illustrated as follows:
UE1: RB1 (a), RB2 (b).
UE2: RB1 (a), RB2 (c).
UE3: RB1 (d), RB2 (b).
UE4: RB1 (b), RB2 (c).
UE5: RB1 (d), RB2 (a).

IAB1: needs to configure all the RB configurations of its downstream UE1 and UE2, and it also needs to know its upstream, that is, three bearers between IAB1 and its parent node IAB3, RB1 (b), RB2 (a), RB3 (c), and the mapping relationship between the downstream bearer and the upstream bearer:

one by one mapping between IAB1 RB1 (b) and UE1 RB2 (b);

one-to-multiple mapping among IAB1 RB2 (a), UE1 RB1 (a) and UE2 RB1 (a);

one by one mapping between IAB1 RB3 (c) and UE2 RB2 (c).

IAB2: needs to configure all RB configurations of its downstream UE3 and UE4, as well as its upstream, that is, three bearers between IAB2 and its parent node IAB3, RB1 (d), RB2 (b), RB3 (c), and the mapping relationship between the downstream bearer and the upstream bearer:

one by one mapping between IAB2 RB1 (d) and UE3 RB1 (d);

one-to-multiple mapping among IAB2 RB2 (b). UE3 RB2 (b) and UE4 RB1 (b);

one by one mapping between IAB2 RB3 (c) and UE4 RB2 (c).

IAB3: needs to configure all RB configurations of its downstream UE5, as well as three bearers related to the downstream LAB: IAB1 RB1 (b), IAB1 RB2 (a), IAB1 RB3 (c), and three bearer related to the downstream IAB2: IAB2 RB1 (d), IAB2 RB2 (b), IAB2 RB3 (c), also it needs to configure its upstream, that is, four bearers between IAB3 and its parent node Donor: IAB3 RB1 (a), IAB3 RB2 (b), IAB3 RB3 (d), IAB3 RB4 (c), and the mapping relationship between the downstream bearer and the upstream bearer:

one-to-multiple mapping among IAB3 RB1 (a), RB2 (a) of UE5 and RB2 (a) of IAB1;

one-to-multiple mapping among IAB3 RB2 (b), RB1 (b) of IAB1 and RB2 (b) of IAB2;

one-to-multiple mapping between IAB3 RB3 (d), RB1 (d) of UE5 and RB1 (d) of IAB2;

one-to-multiple mapping among IAB3 RB4 (c), RB3 (c) of IAB1 and RB3 (c) of IAB2.

The bearer information and bearer mapping relationship that Donor needs to configure to each node are given above. In order to specifically identify the bearer name of each node, at least two pieces of information, node identifier and bearer ID, are required. Node identifier is a unique identity in a Donor. IAB nodes and UE may share the same identifier space, or different identifier spaces can be adopted. For example, UE can use radio network to temporary identity (RNTI Radio Network temporary Identity, CRNTI) or other identifiers to uniquely identify a UE of connected state under a Donor. The corresponding IAB node may reuse the same identifier space, or adopt a separate identifier, as long as the node can be uniquely determined.

When each node receives the bearer configuration information and the bearer mapping relationship sent by the Donor, the corresponding bearer is established according to the configuration information, and the bearer mapping relationship is stored. After the upstream data or the downstream data arrives, the next hop transmission pipeline corresponding to each data can be found according to the bearer mapping relationship.

Here, the bearer mapping relationship is only a mapping of the bearer. When transmitting upstream, it is generally a multiple-to-one mapping, therefore it is generally clear from which downstream the data is carried, and the data has a unique upstream bearer path. While transmitting downstream, because the downstream is generally an one-to-multiple mapping relationship, in addition to the bearer mapping, a target address is also needed to determine the target bearer, for example, the data sent on the RB3 (d) of LAB donor, need to firstly determine whether the destination address is UE5 or IAB2. If it is UE5, the data is mapped to UE RB for transmission, and if it is IAB2, the data is mapped to RB of IAB2 for transmission.

With a clear configuration of mapping relationship, coupled with the assistance of the target address, bearer mapping and transmission in this multi-hop complex network can be carried out according to the configuration of the network.

Example 3: Showing the Signaling Configuration Global QoS ID and the Mapping Relationship Between QoS ID and Data Radio Bearer (Data RB, DRB)

Further referring to FIG. 7, the QoS requirements corresponding to the bearers of each UE or LAB node can be classified, and each QoS classification is assigned with an ID identity, for example:

In the figure, the a bearer is assigned with QoS ID=1, the b bearer is assigned with QoS ID=2, the d bearer is assigned with QoS ID=3, the c bearer is assigned with QoS ID=4. It should be noted that the above QoS ID is valid wider the entire Donor, and the bearers of all nodes with the same QoS ID must have the same or similar QoS requirements. For the Donor node, it is equivalent to reclassifying the service and assigning the corresponding QoS ID which is effective on the RAN side according to the QoS parameters given by the core network when the service is initially established.

In the 5G system, the core network sends two QoS-related identities to the RAN node, one is 5QI, and the other is the QoS flow ID (QoS flow ID, QFI). 5QI is used to identify a set of determined QoS parameters. In the core network protocol, some standardized 5QIs are defined, such as 79 standardized 5QI tables. When the core network configures a new service to the RAN side and inform the RAN side that the QoS parameters thereof are standardized 5QI=3, then the RAN side can easily find the detailed QoS parameters corresponding to 3 in the standardized 5QI table, so as to carry out bearer configuration and transmission of the service while meeting the QoS requirements. Besides the standardized 5QI, certain 5QI parameters per UE can be defined, for example, the 5QI=100 of UE1 corresponds to a set of QoS parameters, and the 5QI=100 of another UE2 may correspond to another set of QoS parameters, and these two sets of QoS parameters can be independent. The QFI parameter is used by the core network to identify different QoS flow ID, which is also independent per UE per PDU session, in other words, in different UE or different PDU session of the same UE, the same QFI may correspond to services of different QoS requirements, completely independent.

It can also be seen that the current 5QI and QFI identities sent by the core network are not sufficient to uniquely determine the QoS requirements, so it is necessary to define new QoS ID which is available on the RAN side and unique under the Donor. Because the granularity of the QoS is guaranteed by the RAN side to have a minimum granularity of RB, QoS ID can be defined per RB. When each RB is established, the Donor assigns it a corresponding QoS ID for subsequent mapping use. Then at each level of the node, the mapping relationship between QoS ID and RB is also defined.

FIG. 7 of example 2 is illustrated as follows:

In the figure, the a bearer is assigned with QoS ID=1, the b bearer is assigned with QoS ID=2, the d bearer is assigned with QoS ID=3, the c bearer is assigned with QoS ID=4.

Then for the bearer of UE1, the services of QoS ID=1 shall be configured to be mapped to RB1, and the services of QoS ID=2 shall be mapped to RB2.

For UE2, the services of QoS ID=1 shall be configured to be mapped to RB1, and the services of QoS ID=4 shall be mapped to RB2.

Other UEs are similar.

For IAB1, the services of QoS ID=2 shall be configured to be mapped to RB1, the services of QoS ID=1 shall be mapped to RB2, and the services of QoS ID=4 shall be mapped to RB3.

For IAB2, the services of QoS ID=3 shall be configured to be mapped to RB1, the services of QoS ID=2 shall be mapped to RB2, and the services of QoS ID=4 shall be mapped to RB3.

For IAB3, the services of QoS ID=1 shall be configured to be mapped to RB1, the services of QoS ID=2 shall be mapped to RB2, the services of QoS ID=3 shall be mapped to RB3, and the services of QoS ID=4 shall be mapped to RB4.

Each packet carries its own destination node identifier and QoS ID parameters when it is transmitted, so that the nodes of each level, after receiving the data packet, can find the correct bearer for mapping according to the destination node identifier and QoS ID parameters. For example, when IAB1 receives the data packet of QoS ID=1 from UE1, according to the configured mapping relationship, the IAB1 can be transmitted to its parent node on its RB2 clearly. For the data packets transmitted downstream, the target node is determined according to the destination node identifier, and then the corresponding RB can be found according to the mapping relationship with the target node.

It should be noted that in some cases, no corresponding RB for a QoS ID can be found or is not configured. At this time, a default RB can be used for mapping in a default manner. The default RB is also configured by the Donor.

In example 3, only the one-to-one mapping between QoS ID and RB is exemplified, in fact, multiple-to-one mapping can be done, and multiple QoS ID can be mapped to a same RB. Of course, the QoS requirements corresponding to these QoS ID must be similar. When the number of RB is sufficient, one-to-one mapping of QoS ID and RB can be adopted, and when the number of RB is not enough, multiple-to-one mapping can be adopted to map multiple similar QoS ID to the same RB.

Example 4: Processing of QoS Parameter

In the existing system, UE is directly connected to gNB and has only one air interface, so the QoS parameters can be processed easily. After deducting the overhead of the wired network, the rest is the QoS requirements that the air interface needs to meet. For example, it is generally assumed that the block error rate of the wired network is 0 and the delay is fixed 20 ms, so after these values are deducted, the remaining is the QoS requirements of the air interface.

But for the multi-hop network, a UE connected to the Donor will go through multiple radio interfaces, and the QoS parameters sent by the core network are the peer-to-peer requirements of the UE, so how to allocate them on each segment of the radio interface is a problem to be solved.

One feasible way is making a rough allocation by the Donor, assigning appropriate parameters to each segment of the air interface so that the final peer-to-peer QoS is satisfied.

Taking the transmission delay as an example, when the peer-to-peer transmission delay of UE is 150 ns, the cable network delay of 20 ms is deducted firstly, and the remaining 130 ms is the delay of multiple segments of air interfaces. Generally speaking, it is not particularly reasonable to assign 130 ms directly to multiple interfaces to make it meet the maximum delay of 130 ms. For example, two air interfaces, each with maximum 65 ms delay. In fact, if the first hop has 10 ms delay, theoretically, the second hop may have 120 ms delay, and it is not necessary to delete it when it reaches 65 ms. In practical, the maximum transmission delay per hop is less than the QoS air interface delay of UE, but larger than the allocation considering each segment, that is, the maximum transmission delay is between 65 ms and 130 ms.

For the block error rate, if the peer-to-peer error rate is 10-6, then after multi-hop, the block error rate per hop should be slightly better than 10-6, in order to meet the peer-to-peer block error rate requirements.

For the rate, in each segment of air interface, it is necessary to strictly guarantee the speed requirements during scheduling. For example, when it is a guaranteed bit rate (Guaranteed Bit Rate, GBR) service, each segment of air interface needs to guarantee the GBR requirement, that is, the PBR is set to GBR when scheduling. If a bearer is multiplexed by multiple GBR services, then the GBR of the RB is a sum of the GBR of each service. If it is a non-GBR (Non-GBR) service, there is also a guaranteed rate PBR. When multiplexed by multiple services, the PBR of the RB is a sum of the PBR of each service. For example, if a UE bearer PBR is X, then the PBR of the RB that aggregates N UEs is N×X.

A donor base station is also provided in an embodiment of the present disclosure. The principle of solving problems by the donor base station is similar to the bearer mapping method of the wireless backhaul node according to the embodiment of the present disclosure, the implementation of the donor base station can refer to the implementation of the method, and will not be repeated here.

Figure 8:
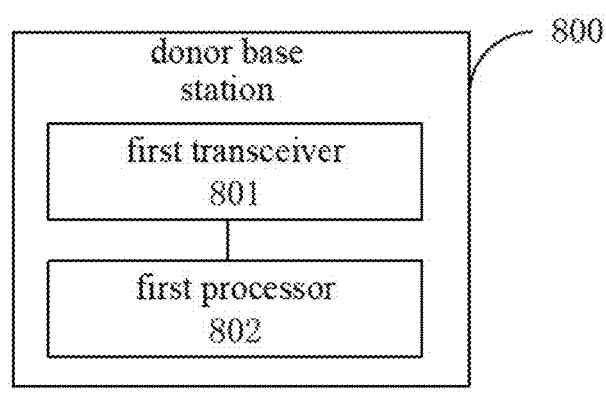
FIG. 8 is a structural diagram of the donor base station according to embodiments of the present disclosure.

FIG. 8 shows a structure of the donor base station according to embodiments of the present disclosure. The donor base station 800 includes: a first transceiver 801 and a first processor 802, wherein the first transceiver 801 is configured to send bearer configuration information to a wireless backhaul node, wherein the bearer configuration information is used to configure one or more of the following:

a first bearer between the wireless backhaul node and the downstream wireless backhaul node or a UE;

the bearer mapping relationship of the first bearer;

a second bearer between the wireless backhaul node and the upstream wireless backhaul node or the donor base station;

the bearer mapping relationship of the second bearer; and the bearer mapping relationship between the first bearer and the second bearer.

The bearer mapping relationship between the first bearer and the second bearer may include: multiple first bearers corresponding to one second bearer; or, one first bearer corresponding to multiple second bearer.

In the embodiments of the present disclosure, optionally, the first transceiver 801 is further configured to send the first indication information to the wireless backhaul node, the first indication information indicating the wireless backhaul node to create, modify, or release a corresponding bearer mapping relationship.

In the embodiments of the present disclosure, optionally, the bearer mapping relationship of the first bearer or the bearer mapping relationship of the second bearer includes one or more of the following:

the first bearer or the second bearer corresponding to one or more QoS identifier;

the first bearer or the second bearer corresponding to a combination of one or more UE identifier and bearer identifier;

the first bearer or the second bearer corresponding to a combination of one or more UE identifier and QoS flow identifier.

In the embodiments of the present disclosure, optionally, the first transceiver 801 is further configured to: send the second indication information to the wireless backhaul node, the second indication information indicating the wireless backhaul node to create or modify a corresponding bearer mapping relationship, according to a combination of the newly added QoS identifier, the newly added UE identifier and the bearer identifier or a combination of the newly added UE identifier and the QoS flow identifier; or, send the third indication information to the wireless backhaul node, the third indication information indicating the wireless backhaul node to release or modify a corresponding bearer mapping relationship, according to a combination of the released QoS identifier, the released UE identifier and the bearer identifier, or a combination of the released UE identifier and the QoS flow identifier.

In the embodiments of the present disclosure, optionally, the first processor 802 is used to: configure QoS parameters of multiple radio interfaces, wherein the radio interfaces refer to radio interfaces through which the UE access to the donor base station, and the QoS parameters satisfy the peer-to-peer demand of the UE.

The donor base station provided in the embodiments of the present disclosure can implement the above method embodiment, and its implementation principle and technical effect are similar, and the present embodiment will not be repeated here.

A wireless backhaul node is also provided in an embodiment of the present disclosure. The principle of solving problems by the wireless backhaul node is similar to the bearer mapping method of the wireless backhaul node according to the embodiment of the present disclosure, the implementation of the wireless backhaul node can refer to the implementation of the method, and will not be repeated here.

Figure 9:
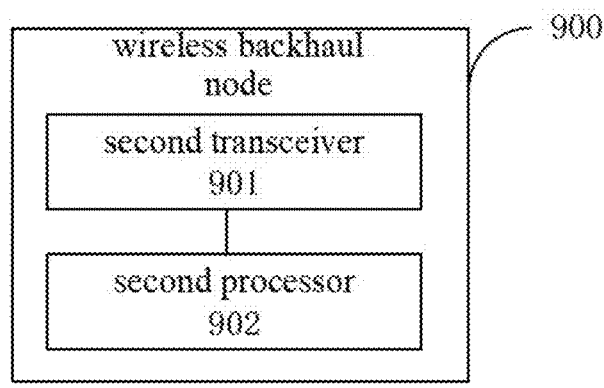
FIG. 9 is a structural diagram of the wireless backhaul node according to embodiments of the present disclosure.

FIG. 9 shows a structure of the wireless backhaul node according to an embodiment of the present disclosure. The wireless backhaul node 900 includes:

a second transceiver 901 and a second processor 902, wherein the second transceiver 901 is configured to receive the bearer configuration information from the donor base station;

the second processor 902 is used to configure one or more of the following according to the bearer configuration information:

the first bearer between the wireless backhaul node and the downstream wireless backhaul node or a UE;

the bearer mapping relationship of the first bearer;

the second bearer between the wireless backhaul node and the upstream wireless backhaul node or the donor base station;

the bearer mapping relationship of the second bearer; and the bearer mapping relationship between the first bearer and the second bearer.

In the embodiments of the present disclosure, optionally, the first bearer or the second bearer is a newly-created bearer according to the bearer configuration information or a reused bearer.

Optionally, the bearer mapping relationship between the first bearer and the second bearer includes: multiple first bearers corresponding to one second bearer; or, one first bearer corresponding to multiple second bearers.

In the embodiments of the present disclosure, optionally, the second transceiver 901 is further configured to receive a data packet from the donor base station or the upstream wireless backhaul node, the data packet including a destination node identifier;

the second processor 902 is further configured to determine the corresponding first bearer according to the destination node identifier and the bearer mapping relationship;

the second transceiver 901 is further configured to send the data packet through the determined first bearer;

or, the second transceiver 901 is further configured to receive a data packet from a downstream wireless backhaul node or a UE, the data packet including a destination node identifier;

the second processor 902 is further configured to determine the corresponding second bearer according to the destination node identifier and the bearer mapping relationship;

the second transceiver 901 is further configured to send the data packet through the determined second bearer.

In the embodiments of the present disclosure, optionally, the second transceiver 901 is further configured to receive the first indication information from the donor base station or the upstream wireless backhaul node;

the second processor 902 is further configured to indicate to create, modify or release the corresponding bearer mapping relationship according to the first indication information.

In the embodiments of the present disclosure, optionally, the bearer mapping relationship of the first bearer or the bearer mapping relationship of the second bearer includes one or more of the following:

the first bearer or the second bearer corresponding to one or more QoS identifiers;

the first bearer or the second bearer corresponding to a combination of one or more UE identifiers and the bearer identities;

the first bearer or the second bearer corresponding to a combination of one or more UE identifiers and the QoS identities.

In the embodiments of the present disclosure, optionally, the second transceiver 901 is further configured to receive a data packet from a donor base station or an upstream wireless backhaul node, the data packet includes: destination node identifier and QoS identifier, or the data packet includes: a combination of the destination node identifier and the UE identifier and the bearer identifier: or a combination of the destination node identifier and the UE identifier and the QoS flow identifier;

the second processor 902 is further configured to determine a corresponding first bearer, according to the bearer mapping relationship, the destination node identifier and the QoS identifier, or according to a combination of the bearer mapping relationship, the destination node identifier, the UE identifier and the bearer identifier, or according to a combination of the bearer mapping relationship, the destination node identifier, the UE identifier and the QoS flow identifier;

the second transceiver 901 is further configured to send the data packet through the determined first bearer.

In the embodiments of the present disclosure, optionally, the second transceiver 901 is further configured to receive a data packet from the downstream wireless backhaul node or a UE, the data packet includes: the destination node identifier and the QoS identifier, or the data packet includes: a combination of the destination node identifier, the UE identifier and the bearer identifier; or a combination of the destination node identifier, the UE identifier and the QoS flow identifier;

the second processor 902 is further configured to determine a corresponding second bearer, according to the bearer mapping relationship, the destination node identifier and the QoS identifier, or according to a combination of the bearer mapping relationship, the destination node identifier, the UE identifier and the bearer identifier combination, or according to a combination of the bearer mapping relationship, the destination node identifier, the UE identifier and the QoS flow identifier;

the second transceiver 901 is further configured to send the data packet through the determined second bearer.

In the embodiments of the present disclosure, optionally, the second transceiver 901 is further configured to receive the second indication information from the donor base station or the upstream wireless backhaul node;

the second processor 902 is further configured to create or modify the corresponding bearer mapping relationship, according to the second indication information and the newly added QoS identifier, a combination of the newly added UE identifier and bearer identifier, or a combination of the newly added UE identifier and the QoS flow identifier combination.

In the embodiments of the present disclosure, optionally, the second transceiver 901 is further configured to receive the third indication information from the donor base station or the upstream wireless backhaul node:

the second processor 902 is further configured to release the corresponding bearer mapping relationship according to the third indication information and the released QoS identifier, a combination of the released UE identifier and the bearer identifier, or a combination of the released UE identifier and the QoS flow identifier.

The wireless backhaul node provided in the embodiments of the present disclosure can implement the above method embodiment, and its implementation principle and technical effect are similar, and the present embodiment will not be repeated here.

Figure 10:
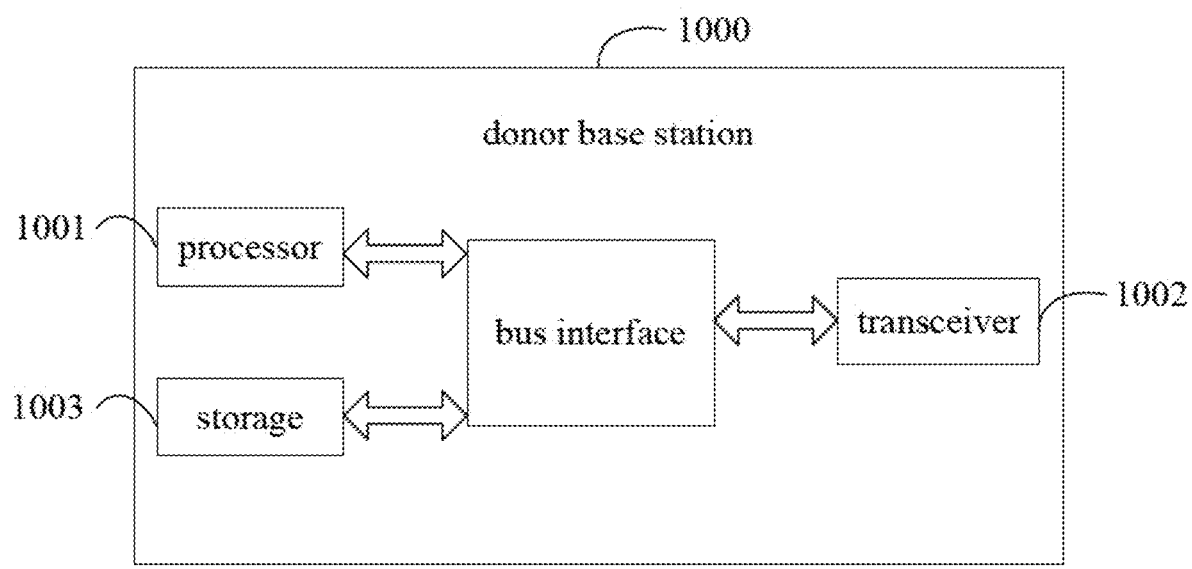
FIG. 10 is another structural diagram of the donor base station according to embodiments of the present disclosure.

Referring to FIG. 10, embodiments of the present disclosure further provide a donor base station 1000 including a processor 1001, a transceiver 1002, a storage 1003, a user interface 1004 and a bus interface.

The processor 1001 may be configured for managing the bus architecture and general processing. The memory 1003 may store the data used by the processor 1001 for performing the operation.

In the embodiments of the present disclosure, the network side equipment 1000 further includes a computer program stored on the storage 1003 and executable by the processor 1001, the computer program implementing, when executed by the processor 1001, the following steps: sending bearer configuration information to the wireless backhaul node, wherein the bearer configuration information is used to configure one or more of: a first bearer between the wireless backhaul node and the downstream wireless backhaul node or a UE: the bearer mapping relationship of the first bearer; a second bearer between the wireless backhaul node and the upstream wireless backhaul node or the donor base station; the bearer mapping relationship of the second bearer; and the bearer mapping relationship between the first bearer and the second bearer.

In FIG. 10, the bus architecture may include any number of interconnected buses and bridges, and connects various circuits including one or more processors represented by the processor 1001 and memories represented by the memory 1003. The bus architecture can also link various circuits, such as peripheral circuits, voltage regulators and power management circuits, which are well known in the art, and therefore will not be repeated herein. The bus interface provides an interface. The transceiver 1002 may be a plurality of elements, including receivers and transmitters, so as to provide units for communicating with various other devices on a transmission medium.

Figure 11:
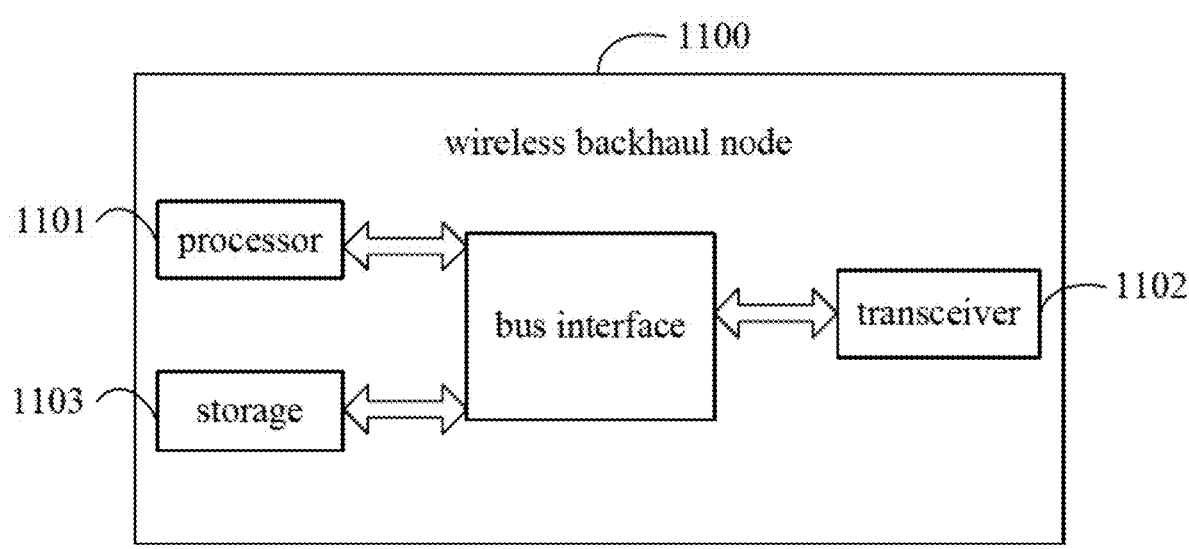
FIG. 11 is another structural diagram of the wireless backhaul node according to embodiments of the present disclosure.

Referring to FIG. 11, embodiments of the present disclosure further provide a wireless backhaul node 1100 including a processor 1101, a transceiver 1102, a storage 1103, a user interface 1104 and a bus interface.

The processor 1101 may be configured for managing the bus architecture and general processing. The memory 1103 may store the data used by the processor 1101 for performing the operation.

In the embodiments of the present disclosure, the network side equipment 1000 further includes a computer program stored on the storage 1103 and executable by the processor 1101, the computer program implementing, when executed by the processor 1101, the following steps: receiving the bearer configuration information from the donor base station; configuring one or more of the following according to the bearer configuration information: the first bearer between the wireless backhaul node and the downstream wireless backhaul node or a UE; the bearer mapping relationship of the first bearer: the second bearer between the wireless backhaul node and the upstream wireless backhaul node or the donor base station; the bearer mapping relationship of the second bearer; and the bearer mapping relationship between the first bearer and the second bearer.

In FIG. 11, the bus architecture may include any number of interconnected buses and bridges, and connects various circuits including one or more processors represented by the processor 1101 and memories represented by the memory 1103. The bus architecture can also link various circuits, such as peripheral circuits, voltage regulators and power management circuits, which are well known in the art, and therefore will not be repeated herein. The bus interface provides an interface. The transceiver 1102 may be a plurality of elements, including receivers and transmitters, so as to provide units for communicating with various other devices on a transmission medium. The steps of the method or algorithm described in the present disclosure can be implemented either in hardware or by the processor executing software instructions. The software instructions may be composed of corresponding software modules, which can be stored in RAM, flash memory, ROM, EPROM, EEPROM, registers, hard disks, removable hard disks, CD-ROMs or any other form of storage medium known in the art. An exemplary storage medium is coupled to a processor so that the processor can read information from the storage medium and write information into the storage medium. Of course, the storage medium can also be part of the processor. The processor and storage media can be located in the ASIC. Also, the ASIC may be located in the core network interface device. Of course, the processor and storage media can also exist as discrete components in the core network interface device.

It should be appreciated by those skilled in the art that, in one or more of the above examples, the functions described in the present disclosure may be implemented with hardware, software, firmware or any combination of them. When implemented using software, these functions can be stored in a computer-readable medium or transmitted as one or more instruction or code on a computer-readable medium. The computer-readable medium includes a computer storage medium and a communication medium, wherein the communication medium includes any medium that is suitable for transmission of a computer program from one place to another. The storage medium can be any available medium that can be accessed by a general-purpose or dedicated computer.

The objects, technical solution and advantageous effects of the present disclosure have been described above with reference to the specific embodiments, but the description is merely made to the embodiments, the present disclosure is not limited to the above-mentioned specific embodiments. Any modification, equivalent replacement and improvements to the solutions of the present disclosure fall within the protection scope of the present disclosure.

Those skilled in the art should understand that the disclosed embodiments may be provided as methods, systems, or computer program products. Therefore, the embodiments of the present disclosure may take the form of pure hardware embodiment, pure software embodiment, or a combination of software and hardware. Furthermore, the embodiments of the present disclosure may take the form of a computer program product implemented on one or more computer available storage media (including, but not limited to, disk memory, CD-ROM, optical memory, etc.) containing computer readable program code.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Apparently, modifications and variations can be made by those of ordinary skill in the art under the inspiration of the present disclosure without departing from the spirit and scope of the present disclosure. If these modifications and variations according to the embodiments of the present disclosure fall within the scope of the present claims and the equivalent arts, the present disclosure also cover these modifications and variations.

What is claimed is:

1. A bearer mapping method for wireless backhaul nodes, applied to a donor base station, the method comprising:
    sending bearer configuration information to a wireless backhaul node, wherein the bearer configuration information is used to configure one or more of:
    a first bearer between the wireless backhaul node and a downstream wireless backhaul node or a UE;
    a bearer mapping relationship of the first bearer;
    a second bearer between the wireless backhaul node and an upstream wireless backhaul node or the donor base station;
    a bearer mapping relationship of the second bearer; and
    a bearer mapping relationship between the first bearer and the second bearer;
    wherein the bearer mapping relationship of the first bearer or the bearer mapping relationship of the second bearer comprises one or more of the following:
    the first bearer or the second bearer corresponding to one or more QoS identifiers;
    the first bearer or the second bearer corresponding to a combination of one or more UE identifiers and bearer identifiers; and
    the first bearer or the second bearer corresponding to a combination of one or more UE identifiers and QoS flow identifiers;
    the method further comprising:
    sending a first indication information to the wireless backhaul node, the first indication information indicating the wireless backhaul node to create, modify or release a corresponding bearer mapping relationship;
    sending a second indication information to the wireless backhaul node, the second indication information indicating the wireless backhaul node to create or modify the corresponding bearer mapping relationship according to a newly added QoS identifier, a combination of a newly added UE identifier and the bearer identifier, or a combination of the newly added UE identifier and a QOS flow identifier; or,
    sending a third indication information to the wireless backhaul node, the third indication information indicating the wireless backhaul node to release or modify the corresponding bearer mapping relationship according to a released QoS identifier, a released combination of the UE identifier and the bearer identifier, or a released combination of the UE identifier and the QoS flow identifier.

2. The method according to claim 1, wherein the bearer mapping relationship between the first bearer and the second bearer comprises: multiple first bearers corresponding to one second bearer; or, one first bearer corresponding to multiple second bearers.

3. The method according to claim 1, further comprising:
    configuring QoS parameters of multiple wireless interfaces, a wireless interface referring to a wireless interface through which the UE accesses the donor base station, and the QoS parameters meet a peer-to-peer requirements of the UE.

4. A donor base station, comprising a processor, a storage, and a computer program stored on the storage and executable by the processor, the computer program implementing, when executed by the processor, the steps of the bearer mapping method for wireless backhaul nodes according to claim 1.

5. A bearer mapping method for a wireless backhaul node, applied to a wireless backhaul node, comprising:
    receiving a bearer configuration information from a donor base station;
    configuring one or more of the following according to the bearer configuration information:
    a first bearer between the wireless backhaul node and a downstream wireless backhaul node or a UE;
    a bearer mapping relationship of the first bearer;
    a second bearer between the wireless backhaul node and a upstream wireless backhaul node or the donor base station;
    a bearer mapping relationship of the second bearer; and
    a bearer mapping relationship between the first bearer and the second bearer;
    wherein the bearer mapping relationship of the first bearer or the bearer mapping relationship of the second bearer comprises one or more of the following:
    the first bearer or the second bearer corresponding to one or more QoS identifiers;
    the first bearer or the second bearer corresponding to a combination of one or more UE identifiers and bearer identifiers; and
    the first bearer or the second bearer corresponding to a combination of the first bearer or the second bearer corresponding to a combination of one or more UE identifiers and the one or more QoS identifiers;
    the method further comprising:
    receiving a data packet from a donor base station or an upstream wireless backhaul node, the data packet comprises: a destination node identifier and a QoS identifier, or the data packet comprises: a combination of the destination node identifier and a UE identifier and a bearer identifier; or a combination of the destination node identifier and the UE identifier and a QoS flow identifier;
    determining a corresponding first bearer, according to the bearer mapping relationship, the destination node identifier and the QoS identifier, or according to a combination of the bearer mapping relationship, the destination node identifier, the UE identifier and the bearer identifier, or according to a combination of the bearer mapping relationship, the destination node identifier, the UE identifier and the QoS flow identifier; and sending the data packet through the determined first bearer;

or, receiving a data packet from the downstream wireless backhaul node or a UE, the data packet comprises: the destination node identifier and the QoS identifier, or the data packet comprises: a combination of the destination node identifier, the UE identifier and the bearer identifier; or a combination of the destination node identifier, the UE identifier and the QoS flow identifier;

determining a corresponding second bearer, according to the bearer mapping relationship, the destination node identifier and the QoS identifier, or according to a combination of the bearer mapping relationship, the destination node identifier, the UE identifier and the bearer identifier combination, or according to a combination of the bearer mapping relationship, the destination node identifier, the UE identifier and the QoS flow identifier; and sending the data packet through the determined second bearer.

6. The method according to claim 5, wherein the first bearer or the second bearer is a newly-created bearer according to the bearer configuration information or a reused bearer.

7. The method according to claim 5, wherein the bearer mapping relationship between the first bearer and the second bearer comprises: multiple first bearers corresponding to one second bearer; or, one first bearer corresponding to multiple second bearers.

8. The method according to claim 5, further comprising:
receiving a data packet from the donor base station or the upstream wireless backhaul node, the data packet including a destination node identifier;
determining the corresponding first bearer according to the destination node identifier and the bearer mapping relationship; and
sending the data packet through the determined first bearer;

or, receiving a data packet from the downstream wireless backhaul node or UE, the data packet including a destination node identifier;
determining the corresponding second bearer according to the destination node identifier and the bearer mapping relationship; and
sending the data packet through the determined second bearer.

9. The method according to claim 5, further comprising:
receiving a first indication information from the donor base station or the upstream wireless backhaul node;
indicating to create, modify or release the corresponding bearer mapping relationship according to the first indication information.

10. The method according to claim 5 further comprising:
receiving a first indication information from the donor base station or the upstream wireless backhaul node; and
creating or modifying the corresponding bearer mapping relationship, or releasing the corresponding bearer mapping relationship;

or, receiving a second indication information from the donor base station or the upstream wireless backhaul node; and
creating or modifying the corresponding bearer mapping relationship according to the second indication information and a newly added QoS identifier, a combination of a newly added UE identifier and bearer identifier, or a combination of the newly added UE identifier and the QoS flow identifier;

or, receiving a third indication information from the donor base station or the upstream wireless backhaul node; and
releasing the corresponding bearer mapping relationship according to the third indication information and the released QoS identifier, a combination of the released UE identifier and the bearer identifier, or a combination of the released UE identifier and the QoS flow identifier.

11. A wireless backhaul node, comprising a processor, a storage, and a computer program stored on the storage and executable by the processor, the computer program implementing, when executed by the processor, the steps of the bearer mapping method for the wireless backhaul node according to claim 5.

12. A non-transitory computer readable storage medium having a computer program stored thereon, the computer program implementing, when executed by a processor, the steps of a bearer mapping method applied to a donor base station, the method comprising:
sending bearer configuration information to a wireless backhaul node, wherein the bearer configuration information is used to configure one or more of:
a first bearer between the wireless backhaul node and a downstream wireless backhaul node or a UE;
a bearer mapping relationship of the first bearer;
a second bearer between the wireless backhaul node and an upstream wireless backhaul node or the donor base station;
a bearer mapping relationship of the second bearer; and
a bearer mapping relationship between the first bearer and the second bearer; or, the computer program implementing, when executed by a processor, the steps of a bearer mapping method applied to a wireless backhaul node, the method comprising:
receiving the bearer configuration information from a donor base station;
configuring one or more of the following according to the bearer configuration information:
a first bearer between the wireless backhaul node and the downstream wireless backhaul node or a UE;
a bearer mapping relationship of the first bearer;
a second bearer between the wireless backhaul node and the upstream wireless backhaul node or the donor base station;
a bearer mapping relationship of the second bearer; and
a bearer mapping relationship between the first bearer and the second bearer;
wherein the bearer mapping relationship of the first bearer or the bearer mapping relationship of the second bearer comprises one or more of the following:
the first bearer or the second bearer corresponding to one or more QoS identifiers;
the first bearer or the second bearer corresponding to a combination of one or more UE identifiers and bearer identifiers; and
the first bearer or the second bearer corresponding to a combination of one or more UE identifiers and QoS flow identifiers;
the method further comprising:
sending a first indication information to the wireless backhaul node, the first indication information indicating the wireless backhaul node to create, modify or release a corresponding bearer mapping relationship;

sending a second indication information to the wireless backhaul node, the second indication information indicating the wireless backhaul node to create or modify the corresponding bearer mapping relationship according to a newly added QoS identifier, a combination of a newly added UE identifier and a bearer identifier, or a combination of the newly added UE identifier and the QoS flow identifier; or, sending a third indication information to the wireless backhaul node, the third indication information indicating the wireless backhaul node to release or modify the corresponding bearer mapping relationship according to a released QoS identifier, a released combination of a UE identifier and the bearer identifier, or a released combination of the UE identifier and the QoS flow identifier.

* * * * *